(12) United States Patent
Barakat et al.

(10) Patent No.: US 10,097,513 B2
(45) Date of Patent: Oct. 9, 2018

(54) TRUSTED EXECUTION ENVIRONMENT EXTENSIBLE COMPUTING DEVICE INTERFACE

(71) Applicant: Microsoft Technology Licensing, LLC, Redmond, WA (US)

(72) Inventors: Youssef Barakat, Bothell, WA (US); Kinshuman Kinshumann, Redmond, WA (US); Brian Perkins, Woodinville, WA (US); Jinsub Moon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/485,737

(22) Filed: Sep. 14, 2014

(65) Prior Publication Data
US 2016/0080320 A1 Mar. 17, 2016

(51) Int. Cl.
*H04L 29/06* (2006.01)
*G06F 21/53* (2013.01)

(52) U.S. Cl.
CPC ............. *H04L 63/00* (2013.01); *G06F 21/53* (2013.01); *H04L 63/101* (2013.01); *H04L 63/20* (2013.01)

(58) Field of Classification Search
CPC ........ H04L 63/00; H04L 63/101; H04L 63/20
See application file for complete search history.

(56) References Cited

U.S. PATENT DOCUMENTS 5,673,316 A  9/1997  Auerbach et al.
5,696,827 A  12/1997  Brands
(Continued)

FOREIGN PATENT DOCUMENTS

EP  2746981 A1  6/2014
WO  WO2011130211  10/2011

OTHER PUBLICATIONS

Peintner et al.,Efficient XML Interchange for rich internet applications, Multimedia and Expo, 2009. ICME 2009. IEEE, Jun. 2009 (Year: 2009).*

(Continued)

*Primary Examiner* — Luu T Pham
*Assistant Examiner* — Harvey I Cohen
(74) *Attorney, Agent, or Firm* — Arent Fox LLP

(57) ABSTRACT

Constructs to define a Trusted Execution Environment Driver that can implement a standard communication interface in a first environment for discovering and/or exchanging messages with secure applications/services executed in a Trusted Execution Environment (TrEE). The first environment can represent an environment with a different security policy from the TrEE. The TrEE driver can include a standard interface and/or mechanism by which applications/services and drivers within a first environment can access secure applications/services in the TrEE, a standard interface and/or mechanism by which third-party vendors can expose their TrEE applications/services to a first environment, a standard interface and/or mechanism by which a TrEE can request applications/services, on its own behalf, from the first environment, and a standard interface and/or mechanism to facilitate the management of secure application/services and/or provide I/O prioritization and security protection for individual secure applications/services.

18 Claims, 7 Drawing Sheets

(56) References Cited

U.S. PATENT DOCUMENTS

| | | |
|---|---|---|
| 5,850,443 A | 12/1998 | Van Oorschot et al. |
| 5,875,247 A | 2/1999 | Nakashima et al. |
| 5,978,475 A | 11/1999 | Schneier et al. |
| 6,230,272 B1 | 5/2001 | Lockhart et al. |
| 6,243,466 B1 | 6/2001 | Young et al. |
| 6,282,295 B1 | 8/2001 | Young et al. |
| 6,470,450 B1 | 10/2002 | Langford et al. |
| 6,513,117 B2 | 1/2003 | Tarpenning et al. |
| 6,754,829 B1 | 6/2004 | Butt et al. |
| 6,757,829 B1 | 6/2004 | Laczko, Sr. et al. |
| 6,975,728 B1 | 12/2005 | Eye et al. |
| 6,976,165 B1 | 12/2005 | Carpentier et al. |
| 7,228,430 B2 | 6/2007 | Benayoun et al. |
| 7,263,608 B2 | 8/2007 | Challener et al. |
| 7,496,768 B2 | 2/2009 | Roberts et al. |
| 7,836,309 B2 | 11/2010 | Holt et al. |
| 7,886,353 B2 | 2/2011 | Avraham et al. |
| 8,156,298 B1 | 4/2012 | Stubblefield |
| 8,375,221 B1 | 2/2013 | Thom et al. |
| 8,397,306 B1* | 3/2013 | Tormasov ............ G06F 21/00 713/164 |
| 8,583,908 B2 | 11/2013 | Zimmer et al. |
| 9,319,220 B2 | 4/2016 | Grewal et al. |
| 2003/0053630 A1 | 3/2003 | Elliott et al. |
| 2004/0098591 A1 | 5/2004 | Fahrny |
| 2004/0190721 A1 | 9/2004 | Barrett et al. |
| 2004/0218762 A1 | 11/2004 | Le Saint et al. |
| 2005/0091487 A1 | 4/2005 | Cross et al. |
| 2005/0138384 A1 | 6/2005 | Brickell et al. |
| 2006/0143446 A1 | 6/2006 | Frank et al. |
| 2007/0028116 A1 | 2/2007 | Murison et al. |
| 2007/0136349 A1* | 6/2007 | Shenbagam ...... G06F 17/30569 |
| 2007/0192329 A1* | 8/2007 | Croft ................ G06F 3/1415 |
| 2009/0019528 A1* | 1/2009 | Wei ................ H04L 63/08 726/4 |
| 2009/0025067 A1* | 1/2009 | Holt ................ G06F 21/575 726/5 |
| 2009/0092252 A1 | 4/2009 | Noll et al. |
| 2009/0193513 A1* | 7/2009 | Agarwal ............ H04L 63/0227 726/15 |
| 2009/0327741 A1 | 12/2009 | Zimmer et al. |
| 2011/0022812 A1* | 1/2011 | van der Linden .... G06F 9/5077 711/163 |
| 2011/0130211 A1 | 6/2011 | Izumino et al. |
| 2011/0276699 A1* | 11/2011 | Pedersen ................ H04L 45/24 709/227 |
| 2011/0302638 A1 | 12/2011 | Cha et al. |
| 2012/0023554 A1* | 1/2012 | Murgia ................ H04L 63/102 726/4 |
| 2013/0007239 A1* | 1/2013 | Agarwal ................ H04L 63/02 709/223 |
| 2013/0031374 A1 | 1/2013 | Thom et al. |
| 2013/0080764 A1 | 3/2013 | Khosravi et al. |
| 2013/0097424 A1 | 4/2013 | Simon et al. |
| 2013/0159704 A1 | 6/2013 | Chandrasekaran |
| 2013/0159726 A1 | 6/2013 | McKeen et al. |
| 2013/0182838 A1 | 7/2013 | Kelley et al. |
| 2014/0007222 A1* | 1/2014 | Qureshi ................ G06F 21/10 726/16 |
| 2014/0040890 A1 | 2/2014 | Novak et al. |
| 2014/0095918 A1 | 4/2014 | Stahl et al. |
| 2014/0130124 A1 | 5/2014 | Ekberg |
| 2014/0237220 A1* | 8/2014 | O'Rourke ............ G06F 9/4401 713/1 |
| 2014/0258736 A1 | 9/2014 | Merchan et al. |
| 2014/0380425 A1* | 12/2014 | Lockett ................ H04L 63/20 726/4 |
| 2015/0007259 A1* | 1/2015 | Peterson ................ G06F 21/54 726/1 |
| 2015/0074392 A1* | 3/2015 | Boivie ................ G06F 21/602 713/164 |
| 2015/0078550 A1 | 3/2015 | Ferguson et al. |
| 2015/0082048 A1 | 3/2015 | Ferguson et al. |

OTHER PUBLICATIONS

Guillory et al., eXtensible Instrument Processing Protocol (XIPP): A Real-Time Signal Processing Framework for Neural Interfaces, 2007 IEEE/EMBS Conference on Neural Engineering, May 2007,pp. 450-452 (Year: 2007).*

Caballero et al., Polyglot: automatic extraction of protocol message format using dynamic binary analysis, CCS '07: Proceedings of the 14th ACM conference on Computer and communications security, Oct. 2007 (Year: 2007).*

"The Trusted Execution Environment", In White Paper, Feb. 2011, 26 pages.

Ekberg, Jan-Erik, "Securing Software Architectures for Trusted Processor Environments", In Doctoral Dissertations, Aug. 5, 2014, 92 pages.

U.S. Appl. No. 14/230,812, Ferguson, et al., "Keying Infrastructure", filed Mar. 3, 2014.

U.S. Appl. No. 14/230,918, Ferguson, et al., "Security Processing Unit with Configurable Access ", filed Mar. 31, 2014.

"Building a Secure System using TrustZone® Technology", In Whitepaper PRD29-GENC-009492C, Dec. 6, 2010, 108 pages.

"DI Service Managment—2008 NPL", retrieved on Aug. 30, 2015 at <<http://www.di-mgt.com.au/cryptoKDFs.html>>, DI Management Services Pty Limited, 2008, 7 pages.

Gallery, et al., "Trusted Mobile Platforms", In Book of Foundations of Security Analysis and Design IV, Aug. 18, 2007, 43 Pages.

Office action for U.S. Appl. No. 14/230,812, dated Sep. 16, 2015, Ferguson et al., "Keying Infrastructure", 12 pages.

The PCT Written Opinion dated Aug. 13, 2015 for PCT application No. PCT/US2014/055058, 9 pages.

The PCT Written Opinion dated Aug. 13, 2015 for PCT application No. PCT/US2014/054458, 6 pages.

"International Search Report and Written Opinion received for International Patent Application No. PCT/US2014/054458", dated Sep. 5, 2014, 11 Pages.

"International Search Report & Written Opinion Issued in PCT Patent Application No. PCT/US2014/055058", dated Dec. 11, 2014, 12 Pages.

"International Preliminary Report on Patentability Issued in PCT Patent Application No. PCT/US2014/054458", dated Dec. 23, 2015, 7 Pages.

Office action for U.S. Appl. No. 14/230,812, dated Feb. 12, 2016, Ferguson et al., "Keying Nfrastructure", 14 pages.

PCT Search Report & Written Opinion for Application PCT/US20115/049535, dated Nov. 27, 2015, 20 pages.

Office action for U.S. Appl. No. 14/230,918, dated May 6, 2016, Ferguson et al., "Security Processing Unit With Configurable Access Control", 10 pages.

Office action for U.S. Appl. No. 14/485,737, dated Jun. 21, 2016, Barakat et al., "Trusted Execution Environment Extensible Computing Device Interface", 32 pages.

Office action for U.S. Appl. No. 14/230,918, dated Aug. 22, 2016, Ferguson et al., "Security Processing Unit With Configurable Access Control", 10 pages.

The PCT Written Opinion of the International Preliminary Examining Authority for PCT application No. PCT/US2015/049535, 7 pages.

Ryan, "Introduction to the TPM 1.2", Mar. 24, 2009, University of Birmingham, 17 pages.

"International Preliminary Report on Patentability Issued in PCT Application No. PCT/US2015/049535", dated Nov. 24, 2016, 8 Pages.

* cited by examiner

TRUSTED EXECUTION ENVIRONMENT EXTENSIBLE COMPUTING DEVICE INTERFACE

BACKGROUND

Operating systems are often required to interface with secure environments to implement general computing operations. These secure environments are generally platform-specific and vendor proprietary. To make use of these secure environments, it is necessary to use a platform-specific secure service protocol as an interface between the operating system and the secure environment. Typically, most proprietary interfaces implement an isolated interface with a secure environment and are restricted to a monolithic service such as a Trusted Platform Module (TPM), secure variables or graphics mini-ports. Such interfaces are often found lacking in flexibility to support arbitrary services and fail to address quality of service or security issues that typically arise with an open, extensible operating system.

Moreover, the use of monolithic proprietary interfaces often requires specialized programming code to be integrated with the high level operating system. Any changes implemented to the operating system will subsequently require changes to the specialized programming code of each monolithic proprietary interface.

SUMMARY

This disclosure describes systems and methods for implementing a Trusted Execution Environment (TrEE) driver to provide a consistent interface for operating system (OS) components or drivers to communicate with secure services in a platform-specific environment.

The TrEE driver can provide a single extension point for a platform-specific "mini driver" to translate message packages into a suitable format for a TrEE, and to drive the hardware interface to transmit them to the secure environment.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
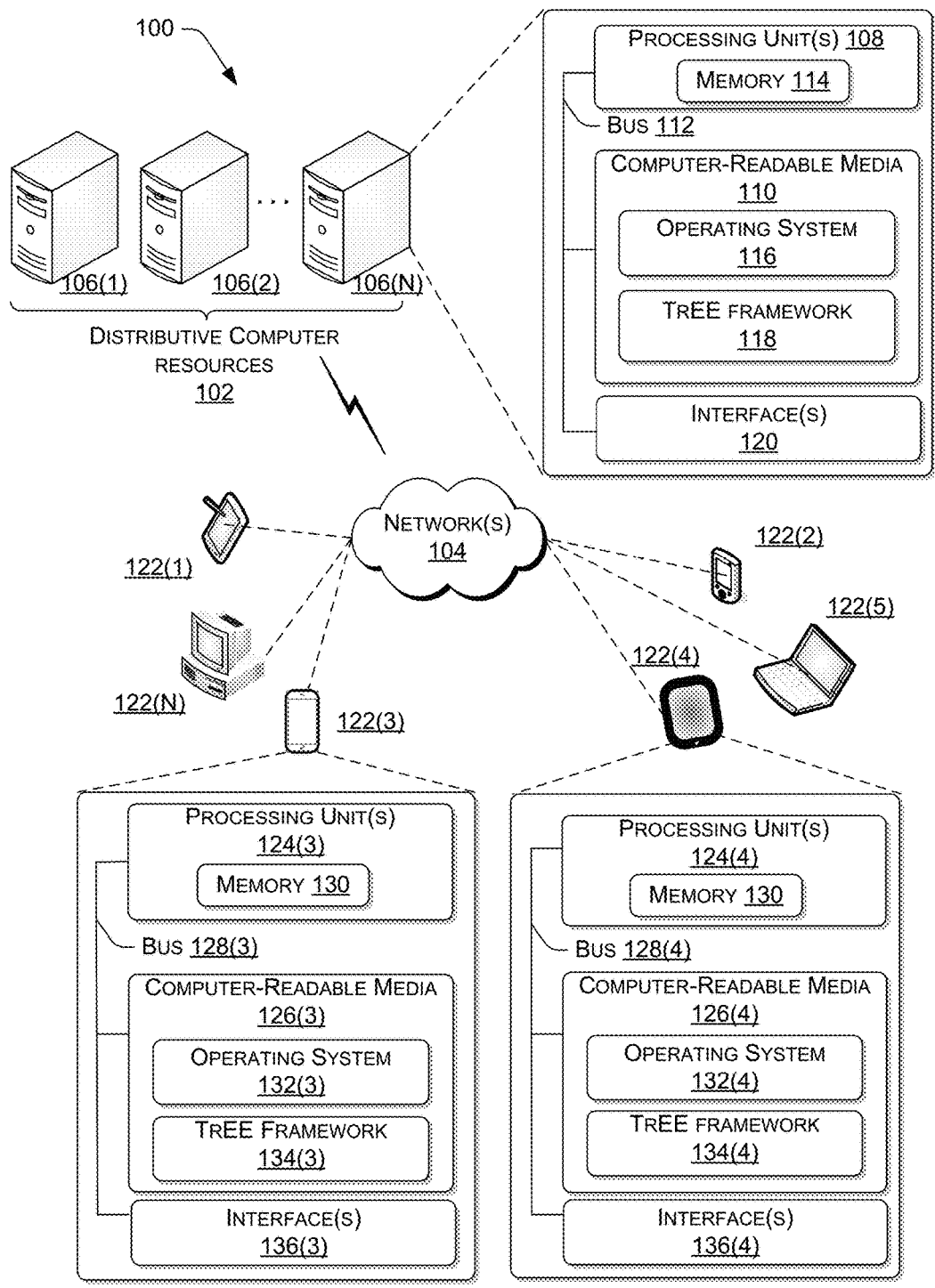
FIG. 1 is a block diagram depicting an example environment for implementing a service interface between a first environment and a TrEE.

Examples described herein provide constructs of a Trusted Execution Environment (TrEE) driver to provide a consistent interface for Operating System (OS) components or drivers that need to communicate with secure applications/services executed in a platform-specific environment. Such secure applications/services may be implemented using specialized programming and/or hardware programmed with specific instructions to implement the specified functions. For example, secure applications/services may have different execution models as is the case for graphics processing units (GPUs) and computer processing unit (CPUs).

The terms "unsecure" and "secure," as described herein, are used to describe the relative strength of security policies associated with a first environment and a secure environment, namely the TrEE. In instances where an "unsecure" first application/service is described as accessing a "secure" second application/service, the terms "unsecure" and "secure" are intended to describe the relative strength of the security policies for the first application/service and the second application/service. In the above example, the unsecure application/service will have a less stringent security policy than the "secure" second application/service. Moreover, the use of the term "unsecure" does not imply a lack of security policy altogether.

The TrEE driver can define and implement a standard communication interface in a first environment for discovering, exchanging messages with, secure applications/services executed in a TrEE. The first environment represents an environment with a different security policy from the TrEE. For example, the first environment may comprise of an operating system, unsecure firmware, or a hypervisor layer. In another embodiment, the first environment may comprise of another TrEE having a different security policy to original interfacing TrEE. The examples provided within this disclosure describe a first environment having a less stringent security policy to the TrEE. However, the constructs of the TrEE Driver equally apply to a first environment having a more stringent security policy than the TrEE.

The TrEE driver implements the standard communication interface by providing a single extension point for a platform-specific "mini driver" to translate message packages into a suitable TrEE format, and to drive the hardware interface to transmit the message packages to the TrEE. In contrast to plug and play (PnP), which is an OS subsystem that is responsible for receiving enumeration requests for busses (either via a hotplug event or a user-initiated event), querying the affected busses for their children, and surfacing new children or tearing down removed children device stacks, the extension point of the TrEE driver can include a set of well-defined functions that can be implemented in the mini-driver and that can "plug-in" to a main operating system TrEE driver. The extension point of the TrEE driver can be built into the driver model and can be applicable to any drivers and busses.

The TrEE driver can include a standard interface and mechanism by which the first environment's unsecure applications/services and drivers can access secure applications/services in a TrEE.

The TrEE driver can provide a standard interface and mechanism by which third-party vendors can expose their TrEE applications/services to the first environment using functions to enumerate, secure, and pass data to and from the services. In other words, the TrEE Driver provides a flexible, non-extensible interface for third-party vendors to code mini drivers that plug-in to the first environment.

The TrEE driver provides a standard interface and mechanism by which a TrEE can request applications/services, on its own behalf, from the first environment.

The TrEE driver facilitates the management of secure application/services and provides Input-Output (IO) Prioritization and security protection on an individual secure application/service basis.

Various examples, scenarios, and aspects are described further with reference to FIGS. 1-7.

Illustrative Environment

FIG. 1 is a block diagram depicting an example environment 100 in which the TrEE driver described herein may operate. In some examples, the various devices and/or components of environment 100 include distributed computing resources 102 that can communicate with one another and with external devices via one or more networks.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as desktop computers, device(s) 106 can include a diverse variety of device types and are not limited to a particular type of device.

For example, desktop computer-type devices can represent, but are not limited to, desktop computers, server computers, web-server computers and personal computers. Mobile-type devices can represent mobile computers, laptop computers, tablet computers, automotive computers, personal data assistances (PDAs), or telecommunication devices. Embedded-type devices can include integrated components for inclusion in a computing device, or implanted computing devices. Special purpose-type devices can include thin clients, terminals, game consoles, gaming devices, work stations, media players, personal video recorders (PVRs), set-top boxes, cameras, appliances and network enabled televisions.

Device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. The processing unit(s) 108 can also include separate memories such as memory 114 on board a CPU-type processor, a GPU-type processor, an FPGA-type accelerator, a DSP-type accelerator, and/or another accelerator. Executable instructions stored on computer-readable media 110 can include, for example, an operating system 116, a TrEE framework 118, and other modules, programs, or applications that are loadable and executable by processing unit(s) 108.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Computer-readable media 110 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 104, while in some examples one or more of a CPU, GPU, and/or accelerator is external to device 104.

Device(s) 106 can also include one or more interfaces 120 to enable communications between the computing device 106 and other networked devices, such as client devices 122. The interfaces 120 can include one or more network interface controllers (NICs), I/O interfaces, or other types of transceiver devices to send and receive communications over a network. For simplicity, other components are omitted from the illustrated device 106. Client devices can include, for example one or more devices 122(1)-122(N). Client device 122 can belong to a variety of categories or classes of devices, which can be the same as or different from devices 106, such as client-type devices, desktop computer-type devices, mobile-type devices, special purpose-type devices, embedded-type devices, and/or wearable-type devices. Thus, although illustrated as mobile computing devices, which may have less computing resources than device(s) 106, client computing device(s) 122 can include a diverse variety of device types and are not limited to any particular type of device. Client computing device(s) 122 can include, but are not limited to, personal data assistants (PDAs) 122(1), mobile phone tablet hybrid 122 (2), mobile phone 122(3), tablet computer 122(4), laptop computers 122(5), other mobile computers, wearable computers, implanted computing devices, desktop computers, personal computers 122(N), automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device configured to receive user input.

Client computing device(s) 122 of the various categories or classes and device types described above, can have one or more processing units 124 operably connected to computer-readable media 126 such as via a bus 128, which in some instances can include one or more of a system bus, a data bus, an address bus, a PCI bus, a Mini-PCI bus, and any variety of local, peripheral, and/or independent buses. The processing unit(s) 124 can also include separate memories such as memory 130 on board a CPU-type processor, a GPU-type processor, an FPGA-type accelerator, a DSP-type accelerator, and/or another accelerator. Executable instructions stored on computer-readable media 126 can include, for example, an operating system 132, a TrEE framework 134, and other modules, programs, or applications that are loadable and executable by processing unit(s) 124.

Client device(s) 122 can also include one or more interfaces 136 to enable communications between the client device 122 and other networked devices, such as device(s) 106. The interfaces 136 can include one or more network interface controllers (NICs), I/O interfaces, or other types of transceiver devices to send and receive communications over a network. For simplicity, other components are omitted from the illustrated client device 122.

Computer-readable media, such as 110 and/or 126, may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 110 and/or 126 can be examples of computer storage media similar to memories 114 and/or 130. Thus, the computer-readable media 110 and/or 126 and/or memories 114 and/or 130 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 2:
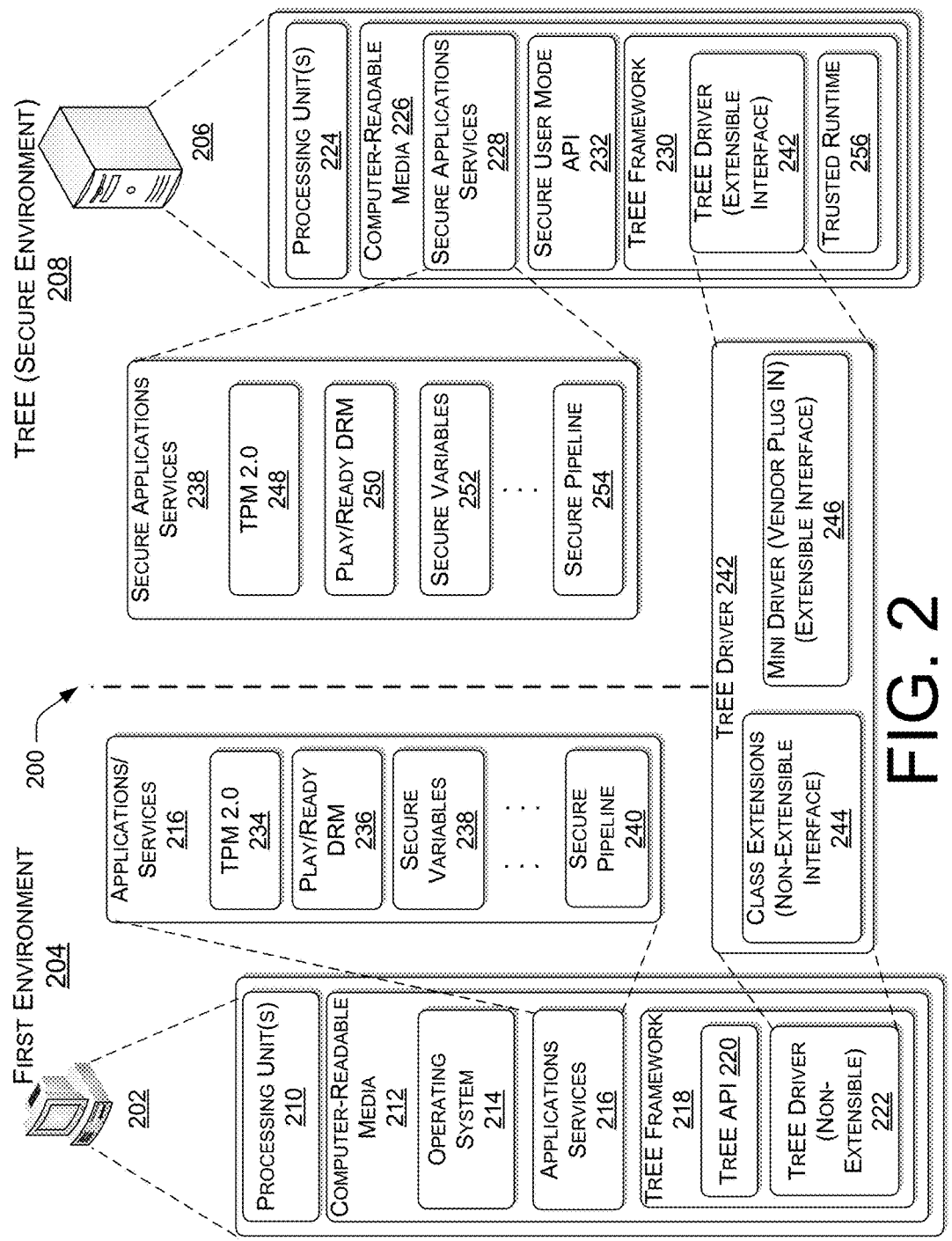
FIG. 2 is a block diagram depicting aspects of example computer devices to execute an operating system and its service interface with a TrEE.

FIG. 2 illustrates an example computer device 202 configured to execute a first environment 204 and an example secure device 206 configured to execute a TrEE 208. In various examples, computing device 202 and secure device 206 can correspond to device 106 and/or 122.

Computing device 202 can have one or more processing units 210 operably connected to computer-readable media 212. Executable instructions stored on computer-readable media 212 can include, for example, an operating system 214, applications/services 216, a TrEE framework 218, and other modules, programs, or applications that are loadable and executable by processing unit(s) 210. For simplicity, other components are omitted from the illustrated device 202.

In at least one example, applications/services 216 may interface with a TrEE Application Programming Interface (API) 220 within the first environment 202. The TrEE API 220 may then interface with the TrEE Driver 222. In some examples, the applications/services 216 may interface directly with the TrEE Driver 222 and bypass a TrEE API 220.

Similarly, computing device 206 can have one or more processing units 224 operably connected to computer-readable media 226. Executable instructions stored on computer-readable media 226 can include, for example, secure applications/services 228, a TrEE framework 230, and other modules, programs, or applications that are loadable and executable by processing unit(s) 224. For simplicity, other components are omitted from the illustrated device 206. In at least one example, secure applications/services 238 may interface with a Secure User Mode API 232 within the TrEE 206. The Secure User Mode 232 can also interface with the TrEE Framework 230.

In at least one example, the applications/services 214 within the first environment 204 that can request access to a secure application/service 228 include, but are not limited to, TPM 2.0 234, Play/Ready DRM 236, Secure Variables 238 and a Secure Pipeline 240.

In some examples, to facilitate the interface between the first environment 204 and the secure environment 208, the TrEE driver 242 includes a non-extensible interface with the first environment 204 (e.g. class extensions 244) and an extensible interface with the secure environment 208 (e.g. mini-driver 246). The class extensions 244 and mini-driver 246 are discussed in more detail below.

The secure environment 208 typically includes secure applications/services 228, such as, but not limited to, TPM 2.0 248, Play/Ready DRM 250, Secure Variables 252 and a Secure Pipeline 254. In at least one example, these applications/services 228 may interface with a Secure User Mode API 232 within the secure environment 208. The Secure User Mode API 232 may then interface with the TrEE Driver 242 via Trusted Runtime 256.

Figure 3:
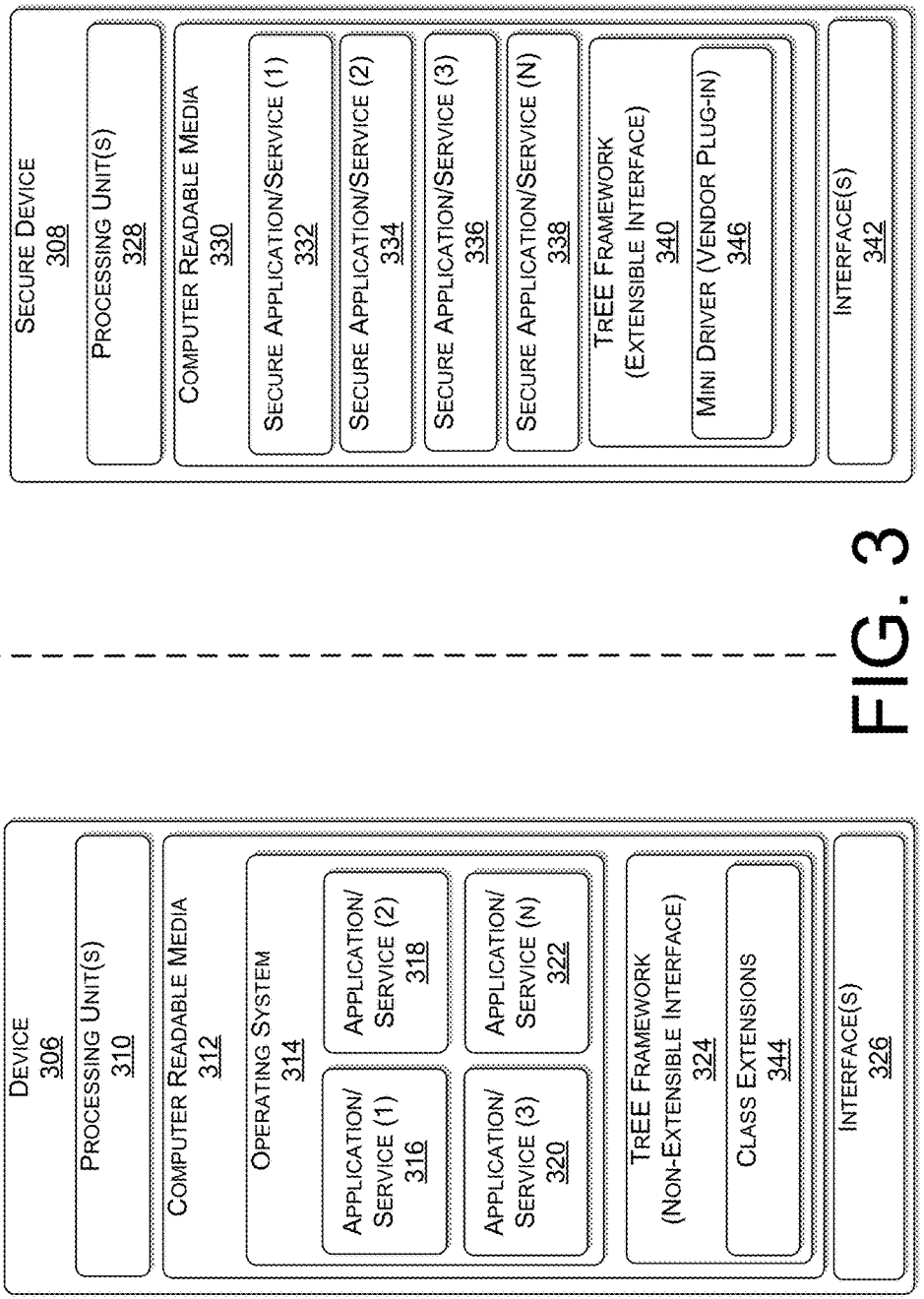
FIG. 3 is a block diagram depicting aspects of example environment architecture of an operating system and TrEE.

FIG. 3 illustrates example architecture of a first environment 302, a TrEE 304, and an example computing device 306 configured to interface with a secure device 308 running the TrEE 304. In various examples, the computing device 306 and secure device 308 can correspond to devices 106, 122 and/or 202. Computing device 306 can have one or more processing units 310 operably connected to computer-readable media 312. Executable instructions stored on computer-readable media 312 can include, for example, an operating system 314, applications/services 316, 318, 320, and/or 322, a TrEE framework 324, interfaces 326 and other modules, programs, or applications that are loadable and executable by processing unit(s) 310. For simplicity, other components are omitted from the illustrated device 306.

Similarly, the secure device 308 can have one or more processing units 328 operably connected to computer-readable media 330. Executable instructions stored on computer-readable media 330 can include, for example, secure applications/services 332, 334, 336, and/or 338, a TrEE framework 340, interfaces 342 and other modules, programs, or applications that are loadable and executable by processing unit(s) 328. For simplicity, other components are omitted from the illustrated device 308.

To facilitate the interface between the first environment 302 and the TrEE 304, a communication interface is established between the first environment TrEE Framework 324 and the secure environment TrEE Framework 340. The first environment TrEE Framework 324 can include a non-extensible interface (e.g. class extensions 344) and the secure environment TrEE Framework 340 can include an extensible interface (e.g. mini-driver 346). The TrEE driver itself is the combination of the first environment TrEE Framework 324 and the secure environment TrEE Framework 340.

The platform-specific parts of the first environment architecture 302 can be executed via registered callbacks by the class extensions 344. For example, a callback can be initialized to give the first environment 302 an opportunity to connect any first environment applications/service 316, 318, 320 and/or 322 that may be required for the secure application/service 332, 334, 336 and/or 338 to operate. As an example, call back can be initialized by the class extension 344 in order to allow the class extension 344 primary control.

In some examples, the secure environment 304 may support an enumeration protocol to return the available secure applications/services 332, 334, 336 and/or 338 to the class extensions 344. The available secure applications/services 332, 334, 336, and/or 338 can be enumerated as separate devices of the TrEE driver along with being reported as a plug and play (PnP) interface matching the Globally Unique Identifiers (GUID). Reporting the secure applications/services as separate device objects allows for independent start and power ordering for each service. Registering as a PnP interface allows the class extension to react to the presence or departure of the secure applications/services 332, 334, 336, and/or 338, at run-time. The creation of separate device object stacks for each service is hidden from the platform-specific code. Instead, the platform-specific code will be notified via callback via the class extension 344, when it is time to create/close or connect/disconnect a specific secure service.

In at least one example, the class extensions 344 define an interface for the first environment code to communicate with secure applications/services 332, 334, 336, and/or 338 in the TrEE 304. There is a single Input-Output-Control (IOCTL) for transmitting a message. A message represents a standard structure ("Service Request") that includes Service-identification and Function-identification information, along with Service-specific input and output buffers. The buffers can be passed by reference in the Service Request and need not be copied by the first environment 302. For user-mode buffers, the TrEE driver can probe the memory for validity, can ensure that the memory is paged-in, and locks the memory so that it cannot be paged-out. The TrEE Driver can also map buffers into global address space, and that mapping can be provided to the secure applications/services 332, 334, 336, and/or 338.

In at least one example, the class extensions 344 can incorporate the logic that is specific to the first environment 302. That is, the class extensions 344 can provide a flexible interface for unsecure applications/services such as 316, 318, 320, and/or 322, which operate within the first environment 302. Class extensions 344 also provide a flexible interface for mini drivers 342 to interface with the first environment. In at least one example, an unsecure application/service 316, 318, 320 and/or 322 in the first environment 302 requesting access to a secure application/service 332, 334, 336 and/or 338 can trigger the class extensions 344 to select a mini-driver 346 that translates the request into a suitable format for the secure environment 304.

The extensible interface 340 of the TrEE Driver can include one or more mini-drivers 346, which in some examples can be vendor-supplied. The mini drivers 346 can be can be associated with individual secure applications/services, such as 332, 334, 336, and/or 338, which operate within the secure environment 304. The TrEE Driver may facilitate one or more mini-drivers 346 from one or more vendors to operate in sequence or in parallel. In at least one example, a mini driver 346 can be defined to access a single monolithic secure application/service 332, 334, 336, or 338 in a secure environment 304. In some examples, a mini driver 346 may access multiple secure applications/services 332, 334, 336, and/or 338 within a secure environment 304 and subsequently can perform multiple operations. An example of available applications/services 332, 334, 336, or 338 within a secure environment 304 can include, but are not limited to, TPM 2.0, play/ready DRM, secure variables, or a secure pipeline, etc.

The mini driver 346 can interface directly with the secure environment 304 and can handle the platform-specific applications/services of the infrastructure. The mini driver 346 includes logic in the platform-specific parts of the infrastructure that describes the TrEE implementation. The mini-driver 346 may also include a setup information file (*.INF File) that describes the TrEE implementation. Class extensions 344, which are native to the first environment, can automatically associate with the platform-specific mini driver, while appearing to the rest of first environment as a flexible interface with first environment functionality. This model allows multiple, and in some instances, different types of secure environments to co-exist.

Figure 4:
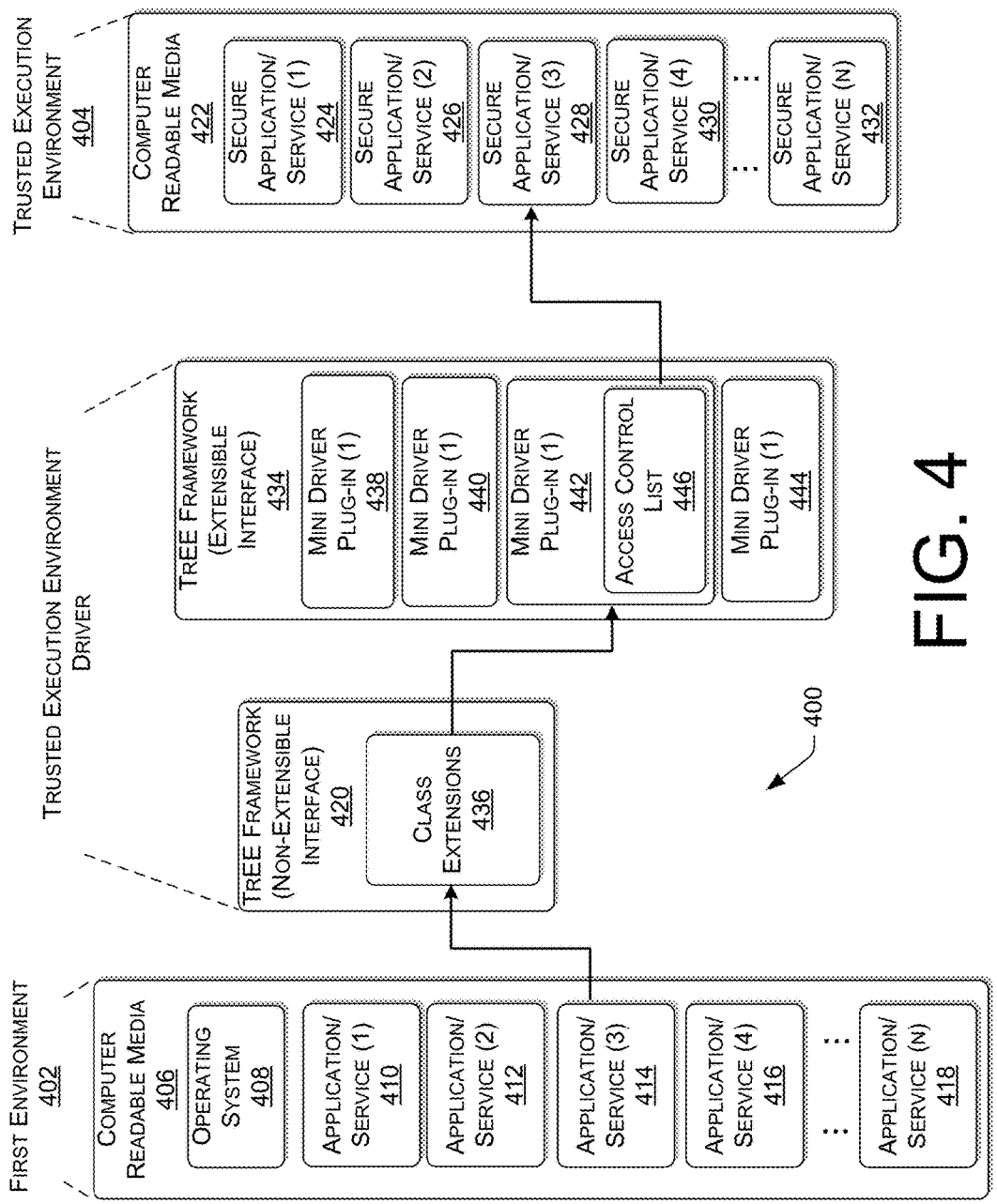
FIG. 4 is a block diagram depicting an example operation of an unsecure application/service in a first environment accessing a corresponding secure application/service from a TrEE.

FIG. 4 illustrates an example flow of communication between a first environment 402 and a Trusted Execution Environment 404. The first environment may include computer readable media 406. Executable instructions stored on computer-readable media 406 can include, for example, an operating system 408, applications/services 410, 412, 414, 416, and/or 418, and a non-extensible interface TrEE Framework 420.

Similarly, a secure environment may include computer readable media 422. Executable instructions stored on computer-readable media 422 can include, for example, an secure applications/services 424, 426, 428, 430, and/or 432, and an extensible interface TrEE Framework 434.

In at least one example, a first environment 402 having an unsecure security policy interfaces with a TrEE 404. An unsecure application/service 414 associated with the first environment 402 can send a request to access a secure application/service 428 from the TrEE 404. The request can be received by the class extensions 436, which can be associated with the non-extensible interface TrEE Framework 420 of the first environment 402. The request to access to a secure application/service 424, 426, 428, 430 and/or 432 can trigger the class extensions 436 to select a mini-driver 438, 440, 442 and/or 444 that translates the request into a suitable format for the secure environment 404.

In some examples, the TrEE 404 can support one or more secure applications/services, such s 424, 426, 428, 430 and/or 432. A "service" can represent a logical or physical group of functions. The services are typically separated to allow for more contained iterations of functionality, including the possibility of parallel development by multiple contributors. For instance, one service can support cryptography services and make use of hardware-accelerated capabilities available to the TrEE. Another service can prime the Graphical Processing Unit (GPU) for secure content, etc.

In some examples, once the class extension 436 has selected the appropriate mini driver 442, the mini-driver 442 can perform a client identity check using an Access Control List 446 (ACL). The ACL 446 is associated with the secure application/service 428 and is a permissions list that ensures only privileged clients can communicate with privileged resources. Privileged clients can include any unsecure applications/services within the first environment. Privileged resources can include any secure applications/services within the TrEE. The ACL 446 can define any access privilege permutation or combination between the privileged clients and the privileged resources.

In at least one example, the mini-driver 442 receives a request to access a secure application/service 428. The mini-driver 430 checks the client identity requesting the secure application/service against the ACL 446. The mini-driver 446 can initiate a communication interface between the first environment application/service 414 and the secure application/service 428 in response to the ACL 446 permitting access. The mini-driver 442 can also remove a communication interface between the first environment application/service 414 and the secure application/service 428 in response to the ACL 446 rejecting access.

Figure 5:
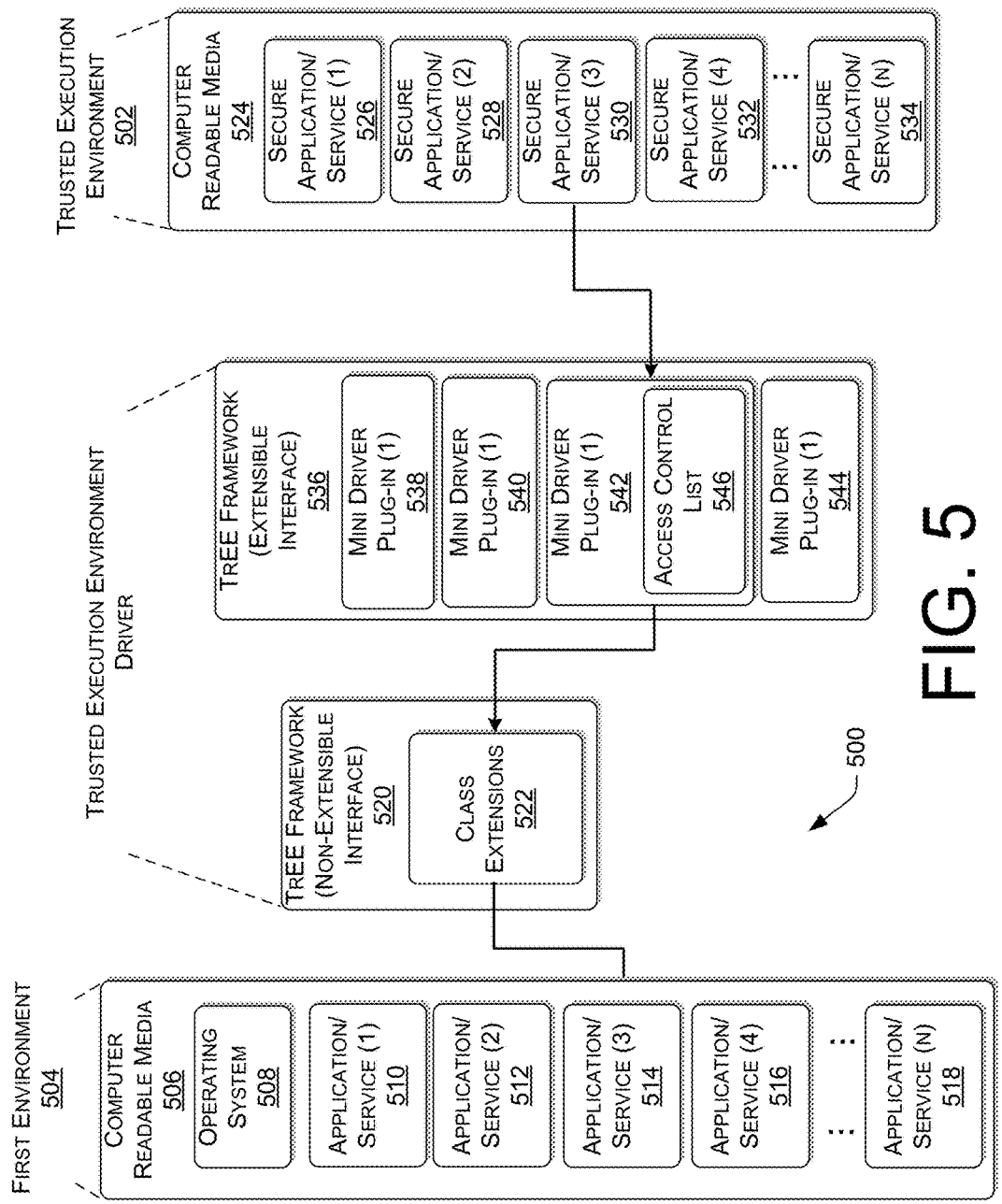
FIG. 5 is a block diagram depicting an example operation of a secure application/service in a TrEE accessing a corresponding unsecure application/service in a first environment.

FIG. 5 illustrates an example flow of communication between a secure application/service 502 and a first environment 504. The first environment 504 may include computer readable media 506. Executable instructions stored on computer-readable media 506 can include, for example, an operating system 508, applications/services 510, 512, 514, 516, and/or 518, and a non-extensible interface TrEE Framework 520. The non-extensible interface TrEE Framework 520 can include a class extension 522.

Similarly, a secure environment 502 may include computer readable media 522. Executable instructions stored on computer-readable media 522 can include, for example, secure applications/services 526, 528, 530, 532, and/or 534, and an extensible interface TrEE Framework 536. The extensible interface TrEE Framework 534 can include multiple mini-drivers 538, 540, 542, and/or 544.

In at least one example, a secure environment 502 can request the use of resources from an unsecure environment 504, often under circumstances in which the requested resources are unavailable within the secure environment itself. For example, a secure environment 502 may not have volatile or non-volatile memory installed and subsequently can request the use of volatile or non-volatile memory from the first environment 504. The mini-driver 542 that corresponds to the requesting secure application/service 528 can receive the request for access to an unsecure application/service 514. In some instances, the request may optionally bypass an ACL 546 since the ACL 546 is intended to control access to secure applications/service 526, 528, 530, 532 and/or 534 from unsecure applications/services 510, 512, 514, 516 and/or 518.

To access a first environment application/service 514 at run-time, the mini-driver 542 can specify the GUID of the first environment interface and can provide an input buffer, output buffer, and buffer size. The class extension 522 can then marshal the request to the mini-driver 542, thus initiating the communication interface between the secure application/service 530 within the TrEE 502 and the unsecure application/service 514 within the first environment 504.

Figure 6:
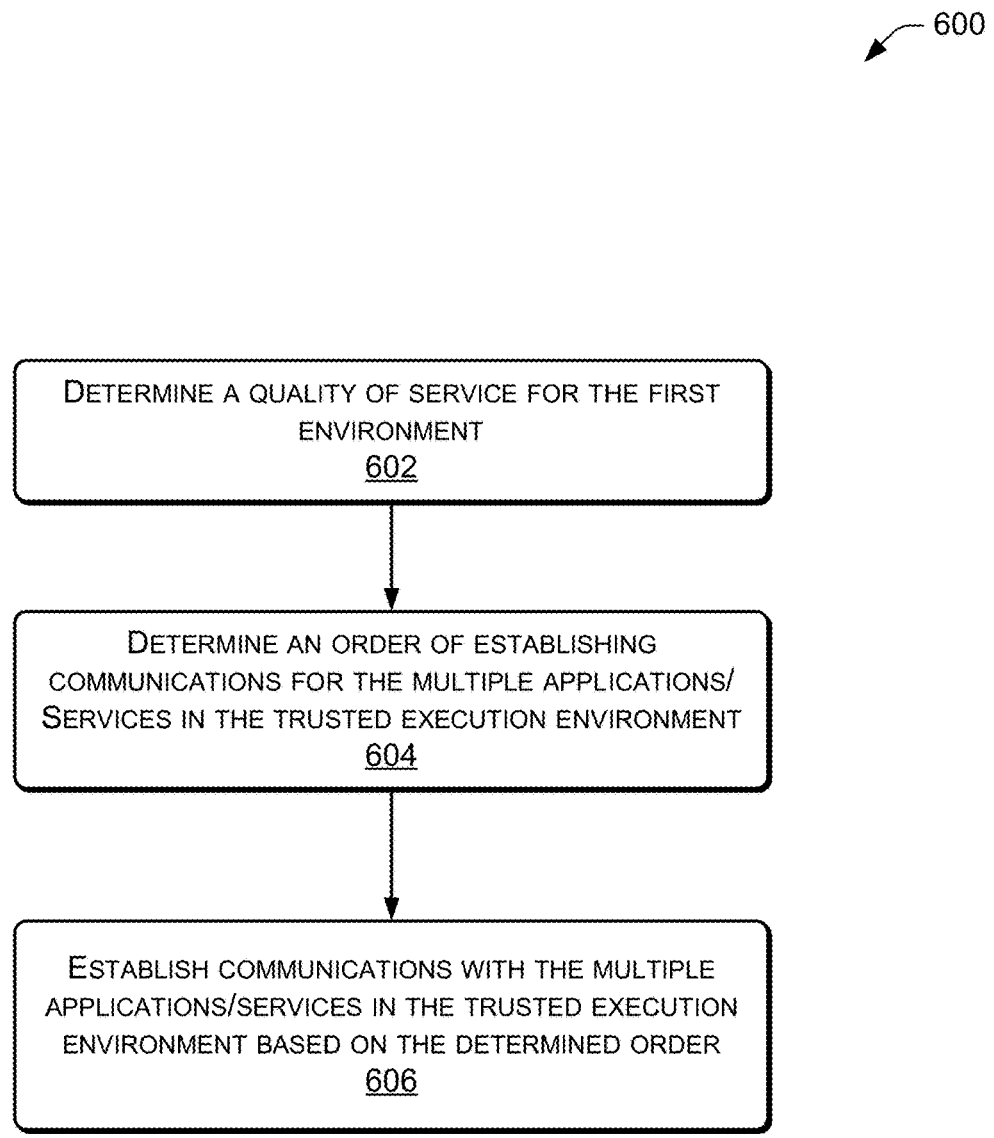
FIG. 6 is a flow diagram showing an example approach for ordering the request for communications of multiple secure applications/services from a TrEE.

FIG. 6 illustrates a flow diagram showing an example approach to ordering the communication interfaces between the first environment and multiple secure applications/services from one or more TrEE, based at least in part on determining a quality of service of the first environment. The quality of service relates to the current operations being implemented in the foreground of the first environment. In at least one example, applications/services currently running in the foreground of the first environment may have priority over other applications/service running in the background. This prioritization allows the first environment to allocate resources to operations that the user deems important. For example, if a user is viewing a movie in the foreground of the first environment, the quality of service can be associated with viewing the movie. As a result, any applications/services that are not related to viewing the movie can be given a lower priority based on the quality of service. Thus, if the first environment requests multiple secure applications/services from a TrEE, the class extensions can prioritize executing the secure applications/services that relate to viewing the movie. The execution of the remaining secure applications/services can be given a lesser priority. An advantage of ordering and prioritizing communication interfaces between a first environment and a TrEE is that operations in the foreground of the first environment are less likely to suffer a delay or lag, due to other applications/services dominating first environment resources.

At step 602, the class extensions can determine a quality of service for the first environment. The quality of service can relate to applications/services currently running in the foreground of the first environment and can be used to prioritize allocation of resources within the first environment.

At step 604, after determining a quality of service for the first environment, the first environment can determine an order of establishing communication interfaces for the multiple applications/services from the TrEE. In at least one example, determining the order of establishing communication interfaces may be executed by the class extensions of the first environment. In some examples, a separate module within the first environment may determine the order, and can transmit an indication corresponding to the order to the class extensions.

At step 606, the class extensions can establish the communication interfaces with the multiple applications/services within the TrEE based at least in part on determining the order of priority from step 604. The communication interfaces may be established in parallel or in sequence, based on the quality of service.

Figure 7:
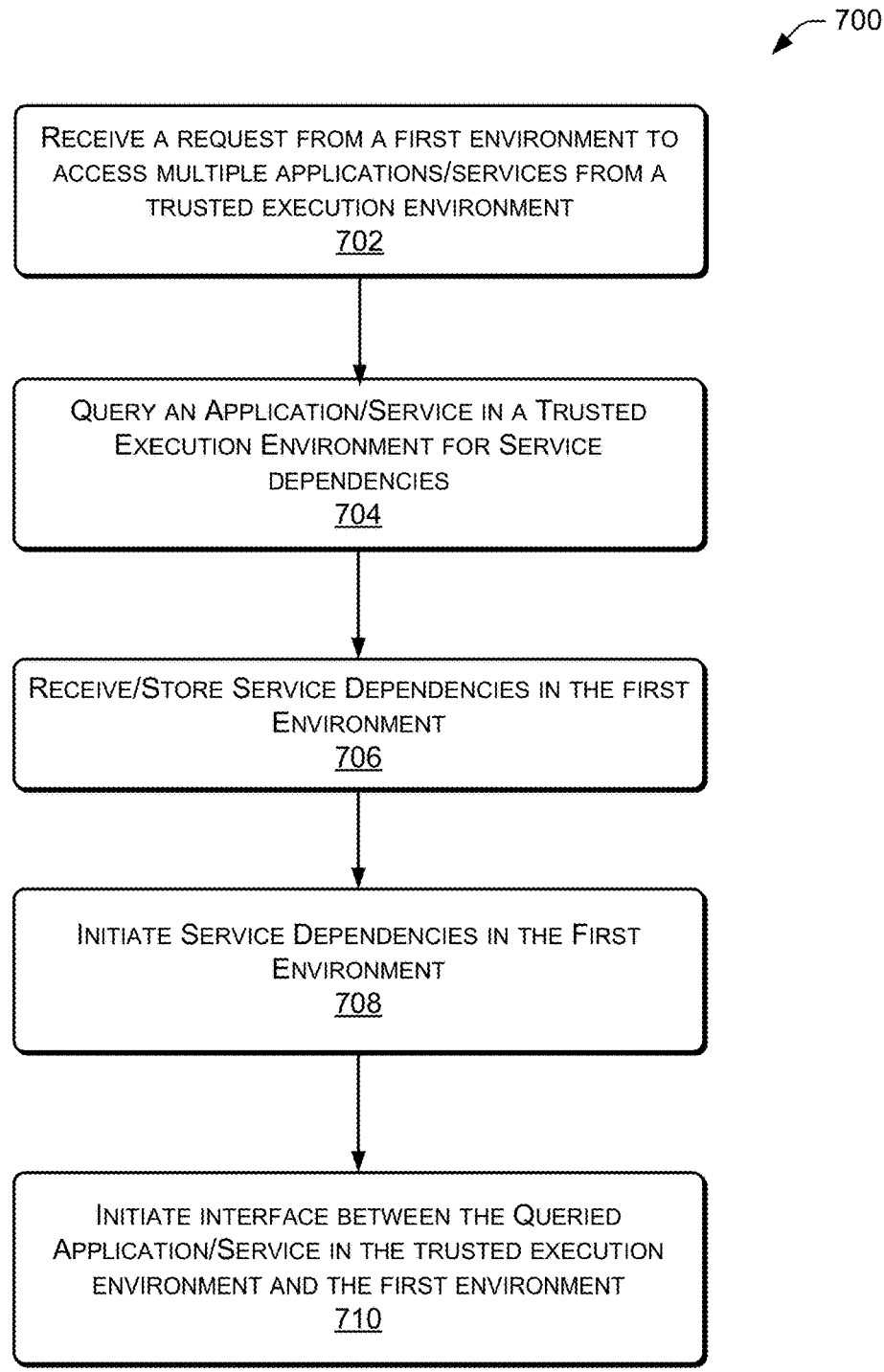
FIG. 7 is a flow diagram of determining and initiating dependencies of an application/service executed in a TrEE.

FIG. 7 illustrates a flow diagram showing an example approach for determining service dependencies associated with a secure application/service from a TrEE. Service dependencies can relate to operational requirements for establishing a communication interface with the requested secure application/service. For example, if the secure application requires three unsecure services to be running in the first environment, the three unsecure services become service dependencies of the secure application. Determining service dependencies prior to initiating a communication interface can enable the first environment is able to efficiently manage its resources and can prevent operational lag of the secure application while waiting for service dependencies to come online.

There are at least two types of service dependencies recognized. OS Service dependencies can specify OS services for use of a secure service. The secure service may not initiate unless the specified OS services are available. Shared secure resource dependencies can specify some shared resources that the secure service uses which can also be shared with another secure service. If all instances of the shared resource are in use, a new request to a service also using the resource may not be delivered until the resource is made available again. Delaying delivery of the resource can prevent operational lag of the secure service while waiting for the service dependency to become available.

Therefore, to simplify the TrEE design and to leverage existing first environment services where possible, the class extensions can support callbacks to the first environment from the TrEE for first environment application/service access. Each TrEE application/service can provide a list of first environment interfaces (GUIDs) for performing its function (service dependencies). In at least one example, the TrEE class extensions need not enumerate a service until the corresponding interfaces are available. In addition, in some examples the service can be removed if one or more of the corresponding interfaces are removed.

For example, the first environment, running a limited number of applications/services in the foreground, may commence cycling through to a lower power state to conserve system energy resources. In some circumstances, establishing a communication interface with a secure application/service may require other resources to be executed in the first environment. However, the dependent resources may already be inadvertently unavailable by the first environment cycling through to a lower power state. In these instances, the secure application/service may fail to respond or become static while waiting for the dependent resources to come online. Subsequently, the service dependencies failing to come online may cause the secure application/service to "hang" or "freeze" indefinitely. Therefore, by determining the service dependencies of a secure application/service prior to initiating the communication interface with the TrEE, cycling through power states can be efficiently managed to avoid shutting down required service dependencies.

In some examples, a system entering a lower power state may represent closing applications/services that are not in use. For example, a "power on suspend" mode can indicate that the processor caches are flushed and the CPU(s) have stopped executing instructions. However the power to the CPU(s) and volatile memory (RAM) can be maintained. In contrast, a "hibernation" mode can indicate that the content of volatile memory (RAM) is saved to non-volatile memory, such as a hard drive, and the system can be powered down.

At step 702, the class extensions can receive a request from a secure application/service to access a secure application/service within a TrEE.

At step 704, the first environment can initiate a query to the TrEE to provide a list of the first environment interfaces (GUIDs), also known as service dependencies that the secure application/service can use to perform its function.

At step 706, the class extensions can receive a list of service dependencies associated with the secure application/service.

At step 708, the first environment can ensure that the enumerated service dependencies are running in the first environment. In at least one example, the class extensions can initiate the service dependencies. In some examples, the class extensions can send an indication to other modules within the first environment to initiate the enumerated service dependencies.

If the service dependencies are not running in the first environment, the first environment can initiate the service dependencies. In some examples, if the service dependencies are not running in the first environment, and the first environment has failed to initiate the service dependencies, the class extensions can remove the communication interface for the requested secure application/service.

At step 710, the class extensions can initiate the communication interface between the first environment and the requested secure application, provided that the service dependencies have been queried and are running within the first environment.

Example Clauses

A: A method comprising: receiving from a first application or service within a client environment, via a non-extensible interface, a message to establish a communication with a second application or service within a third party environment; selecting, one extensible interface from a plurality of extensible interfaces, the one extensible interface being appropriately associated with the second application or service within the third party environment; and establishing the communication between the first application or service and the second application or service.

B: A method as paragraph A recites, wherein the third party environment comprises at least one of an operating system, a hypervisor layer or firmware.

C: A method as paragraph A or B recites, wherein the non-extensible interface is configured to communicate with the client environment and an individual extensible interface of the plurality of extensible interfaces is configured to communicate with a corresponding individual third party environment.

D: A method as any of paragraphs A-C recites, wherein the client environment and the third party environment have different security policies.

E: A method as any of paragraphs A-D recites, further comprising, in response to the establishing the communication, transmitting and receiving data between a first application or service and a second application or service.

F: A method as any of paragraphs A-E recites, wherein establishing the communication further comprises: identifying an Access Control List (ACL) associated with the third party environment; verifying, by the ACL, that the first application or service is permitted to access the second application or service; and establishing the communication between the first application or service and the second application service based at least in part on ACL permissions.

G: A method as any of paragraphs A-F recites, wherein an Access Control List (ACL) associated with the third party environment includes at least one security policy associated with an individual application or services within the third party environment.

H: A computer-readable medium having thereon computer-executable instructions to configure a computer to perform a method as any of paragraphs A-G recites.

I: A system comprising: a processor; and a computer-readable medium having thereon computer-executable instructions to configure a computer to perform a method as any of paragraphs A-G recites.

J: A system comprising: means for receiving from a first application or service within a client environment, via a non-extensible interface, a message to establish a communication with a second application or service within a third party environment; means for selecting, one extensible interface from a plurality of extensible interfaces, the one extensible interface being appropriately associated with the second application or service within the third party environment; and means for establishing the communication between the first application or service and the second application or service.

K: A system as paragraph J recites, wherein the third party environment comprises at least one of an operating system, a hypervisor layer or firmware.

L: A system as paragraph J or K recites, wherein the non-extensible interface is configured to communicate with the client environment and an individual extensible interface of the plurality of extensible interfaces is configured to communicate with a corresponding individual third party environment.

M: A system as any of paragraphs J-L recites, wherein the client environment and the third party environment have different security policies.

N: A system as any of paragraphs J-M recites, further comprising, means for transmitting and receiving data between a first application or service and a second application or service in response to the establishing the communication.

O: A system as any of paragraphs J-N recites, wherein the means for establishing the communication further comprises: means for identifying an Access Control List (ACL) associated with the third party environment; means for verifying, by the ACL, that the first application or service is permitted to access the second application or service; and means for establishing the communication between the first application or service and the second application service based at least in part on ACL permissions.

P: A system as any of paragraphs J-O recites, wherein an Access Control List (ACL) associated with the third party environment includes at least one security policy associated with an individual application or services within the third party environment.

Q: A system comprising: one or more processors; a computer readable medium coupled to the one or more processors, including one or more modules that are executable by the one or more processors to: receive a request from a first application or service in a first environment, via an Application Programming Interface (API), to access a second application or service in a trusted execution environment; identify an extensible interface associated with the trusted execution environment; and establish a communication via the extensible interface between the first application or service and the second application or service.

R: A system as paragraph Q recites, wherein the request from the first application or service is a first request and the communication is a first communication, further comprising one or more processors to: determine, a quality of service associated with the first environment, the quality of service identifying a current priority of applications or services to be executed on the first environment; receive at least a second request from a different application or service in the first environment to access at least another application or service in the trusted execution environment; associate, at least a second communication interface with the at least second request; determine, an order of establishing the first communication and the at least second communication based at least in part on the determined quality of service; and establish the at least second communication interface based at least in part on the determined order.

S: A system as paragraph Q or R recites, wherein the determining the quality of service further comprises one or more processors to determine whether the first request or the at least second request is associated with an operation in the foreground or the background of the first environment.

T: A system as any of paragraphs Q-S recites, wherein the determining the order of establishing the first communication and the at least communication is based at least in part on power management requirements associated with the first environment.

U: A system as any of paragraphs Q-T recites, further comprising one or more processors to: prior to the receiving the request from the first application or service in the first environment, to receive a query from the client environment for a list of dependencies associated with executing the second application or service with the trusted execution environment, the list of dependencies comprising a sequence of operations required to access the second application or service.

V: A system as any of paragraphs Q-U recites, further comprising one or more processors to: prior to establishing the communication interface between the first application or service and the second application or service, to initiate the sequence of operations required to access the second application or service, based at least in part on the list of dependencies.

W: A system as any of paragraphs Q-V recites, further comprising one or more processors to: remove the communication interface between the first application or service and the second application or service based on a determination that the sequence of operations required to access the second application or service, fails to initiate.

X: A system as any of paragraphs Q-W recites, wherein the communication interface comprises at least one of TPM 2.0, Play/Ready DRM, secure variables or a secure pipeline.

Y: A system as any of paragraphs Q-X recites, wherein the extensible interface is implemented by firmware associated with the trusted execution environment.

Z: A computer-readable medium having computer-executable instructions thereon, that upon execution configure a computer to perform operations comprising: receiving, via an extensible interface, a message from a first application or service within a first environment to establish a communication with a second application or service within a second environment, the first environment and the second environment having different security policies; and establishing, via a non-extensible interface associated with the second environment, the communication with the first application or service and the second application or service.

AA: A computer-readable medium as paragraph Z recites, wherein the first environment has a higher level security policy than the second environment security policy.

AB: A computer-readable medium as paragraph Z or AA recites, wherein the message comprises a request to access a resource in the second environment, the resource including at least one of an application, storage facility or service.

AC: A computer-readable medium as any of paragraphs Z-AB recites, further comprising, in response to the establishing the communication, transmitting and receiving data between a first application or service and a second application or service.

AD: An apparatus comprising: a processor; and a computer-readable medium as any of paragraphs Z-AC recites.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
providing an interface platform including a non-extensible interface and a plurality of extensible interfaces, each of the plurality of extensible interfaces specifically configured to communicate with an associated application or service within a third party environment in a format specific to the associated application or service, and the non-extensible interface providing a single extension point for a plurality of applications or services in a client environment to communicate with third party applications or services in the third party environment;
identifying a priority of the plurality of applications or services to be executed within the client environment, wherein the plurality of applications or services includes a first application or a first service having a higher priority than a background application or background service;
receiving from the first application or first service among the plurality of applications or services within the client environment, via the non-extensible interface, a first request to establish a first communication with a second application or second service within the third party environment, the first request includes a first message in a first format, and wherein the first application or first service has a first security policy and the second application or second service has a second security policy that is different from the first security policy;
receiving from the background application or background service among the plurality of applications or services within the client environment, via the non-extensible interface, a second request to establish a second communication with a third application or third service within the third party environment, wherein the second request includes a second message;
selecting, from the plurality of extensible interfaces, a first extensible interface being associated with the second application or second service within the third party environment;
selecting, from the plurality of extensible interfaces, a second extensible interface being associated with the third application or third service within the third party environment;
modifying, by the first extensible interface, the first format of the first message to a second format of the first message, based at least in part on the first security policy and the second security policy;
establishing, via the first extensible interface, the first communication between the first application or first service and the second application or second service;
establishing, via the second extensible interface, the second communication between the background application or background service and the third application or third service;
transmitting, via the first communication, the second format of the first message to the second application or second service prior to transmitting, via the second communication, the second message to the third application or third service in response to the first application or the first service having the higher priority than the background application or background service; and
transmitting and receiving data between the first application or first service and the second application or second service.

2. The method of claim 1, wherein the third party environment comprises at least one of an operating system, a hypervisor layer, or firmware.

3. The method of claim 1, further comprising:
identifying an Access Control List (ACL) associated with the third party environment, the ACL including ACL permissions;
verifying, by the ACL, that the first application or first service is permitted to access the second application or second service, wherein establishing the communication between the first application or first service and the second application or second service is further based on the ACL permissions.

4. The method of claim 3, wherein the ACL includes at least one security policy associated with an individual application or service within the third party environment.

5. A computer-readable storage device having computer-executable instructions thereon that, upon execution, configure a computer to perform operations comprising:
providing an interface platform including a non-extensible interface and a plurality of extensible interfaces, each of the plurality of extensible interfaces operable to communicate with an associated application or service in a first environment in a specific message format, and the non-extensible interface providing a single extension point for a plurality of applications or services in a second environment to communicate with third party applications or services in the first environment;
identifying a priority of the plurality of applications or services to be executed within the second environment, wherein the plurality of applications or services includes a first application or a first service having a higher priority than a background application or background service;
receiving, via the non-extensible interface, a first request from the first application or first service among the plurality of applications or services within the second environment to establish a first communication with a second application or second service within the first environment, the first request includes a first message in a first format, and wherein the first environment has a first security policy and the second environment has a second security policy that is different from the first security policy;
receiving from the background application or background service among the plurality of applications or services within the second environment, via the non-extensible interface, a second request to establish a second communication with a third application or third service within the first environment, wherein the second request includes a second message;
selecting, from the plurality of extensible interfaces, a first extensible interface being associated with the second application or second service within the first environment;
selecting, from the plurality of extensible interfaces, a second extensible interface being associated with the third application or third service within the first environment;
modifying, by the first extensible interface, the first format of the first message to a second format of the first message, based at least in part on the first security policy and the second security policy;
establishing, via the first extensible, the first communication between the first application or the first service and the second application or the second service;
establishing, via the second extensible interface, the second communication between the background application or background service and the third application or third service;
transmitting, via the first communication, the second format of the first message to the second application or the second service prior to transmitting, via the second communication, the second message to the third application or third service in response to the first application or the first service having the higher priority than the background application or background service; and
transmitting and receiving data between the first application or first service and the second application or second service, in response to establishing the first communication.

6. The computer-readable storage device of claim 5, wherein the first security policy is a higher level security policy than the second security policy.

7. The computer-readable storage device as claim 5, wherein the first or second message comprises a request to access a resource in the first environment, the resource including at least one of an application, a storage facility, or a service.

8. The method of claim 1, wherein the first extensible interface includes a plug-in driver to the second application or second service within the third party environment.

9. The method of claim 8, further comprising receiving a registration associated with the plug-in driver, wherein the registration allows the interface platform to react to presences or departures of the first application or first service or the second application or second service.

10. The method of claim 1, further comprising:
modifying, by a third extensible interface, a third format of the second message to a fourth format of the second message, based at least in part on a background security policy of the background application or background service and a third security policy of the third application or third service, wherein the background security policy is different from the third security policy; and
wherein transmitting the second message further includes transmitting the fourth format of the second message to the third application or third service.

11. A system comprising:
one or more processors, and a computer-readable storage device coupled to the one or more processors, the computer-readable storage device including one or more modules that are executable by the one or more processors to:
provide an interface platform including a non-extensible interface and a plurality of extensible interfaces, each of the plurality of extensible interfaces specifically configured to communicate with an associated application or service within a third party environment in a format specific to the associated application or service, and the non-extensible interface providing a single extension point for a plurality of applications or services in a client environment to communicate with third party applications or services in the third party environment;
identify a priority of the plurality of applications or services to be executed within the client environment, wherein the plurality of applications or services includes a first application or a first service having a higher priority than a background application or background service;
receiving from the first application or first service among the plurality of applications or services within the client environment, via the non-extensible interface, a first request to establish a first communication with a second application or second service within the third party environment, the first request includes a first message in a first format, and wherein the first application or first service has a first security policy and the second application or second service has a second security policy that is different from the first security policy;

receiving from the background application or background service among the plurality of applications or services within the client environment, via the non-extensible interface, a second request to establish a second communication with a third application or third service within the third party environment, wherein the second request includes a second message;

selecting, from the plurality of extensible interfaces, a first extensible interface being associated with the second application or second service within the third party environment;

selecting, from the plurality of extensible interfaces, a second extensible interface being associated with the third application or third service within the third party environment;

modifying, by the first extensible interface, the first format of the first message to a second format of the first message, based at least in part on the first security policy and the second security policy;

establishing, via the first extensible interface, the first communication between the first application or first service and the second application or second service;

establishing, via the second extensible interface, the second communication between the background application or background service and the third application or third service;

transmitting, via the first communication, the second format of the first message to the second application or second service prior to transmitting, via the second communication, the second message to the third application or third service in response to the first application or the first service having the higher priority than the background application or background service; and transmitting and receiving data between the first application or first service and the second application or second service.

12. A method comprising:

providing an interface platform including a non-extensible interface and a plurality of extensible interfaces, each of the plurality of extensible interfaces specifically configured to communicate with an associated application or service within a third party environment in a format specific to the associated application or service, and the non-extensible interface providing a single extension point for multiple different applications or services in a client environment to communicate with the plurality of different applications or services in the third party environment;

receiving from a first application or first service within the client environment, via the non-extensible interface, a first request to establish a communication with a second application or second service within the third party environment, the first request including a message being in a first format, and wherein the first application or first service has a first security policy and the second application or second service has a second security policy that is different from the first security policy;

receiving a list of service dependencies including dependent resources associated with the second application or second service within the third party environment;

determining whether any service dependencies remain inactive;

initiating any inactive service dependencies within the third party environment;

selecting, from the plurality of extensible interfaces, an extensible interface being associated with the second application or second service within the third party environment;

modifying, by the extensible interface, the first format of the message to a second format of the message, based at least in part on the first security policy and the second security policy;

establishing, via the extensible interface, the communication between the first application or first service and the second application or second service; and transmitting, via the communication, the second format of the message to the second application or second service; and transmitting and receiving data between the first application or first service and the second application or second service.

13. The system of claim 11, wherein the order of establishing the first communication interface and the second communication interface is further based at least in part on power management requirements associated with the first environment.

14. The system of claim 11, wherein, prior to receiving the first request from the first application or service in the first environment, the one or more modules are further executable by the one or more processors to:

receive a query from a client environment for a list of dependencies associated with executing the second application or second service with the trusted execution environment, the list of dependencies comprising a sequence of operations to access the second application or second service.

15. The system of claim 11, wherein, prior to establishing the non-extensible interface between the first application or first service and the second application or second service, the one or more modules are further executable by the one or more processors to:

initiate the sequence of operations to access the second application or second service, based at least in part on the list of dependencies.

16. The system of claim 11, wherein the one or more modules are further executable by the one or more processors to:

remove the non-extensible interface between the first application or first service and the second application or second service based at least in part on the sequence of operations to access the second application or second service failing to initiate.

17. The system of claim 11, wherein the non-extensible interface comprises at least one of Trusted Platform Module (TPM) 2.0, Play/Ready Digital Rights Management (DRM), secure variables, or a secure pipeline.

18. The system of claim 11, wherein the extensible interface is implemented by firmware associated with the trusted execution environment.

* * * * *